US008402499B2

(12) United States Patent
Vallier et al.

(10) Patent No.: US 8,402,499 B2
(45) Date of Patent: Mar. 19, 2013

(54) VOICEMAIL INTERFACE SYSTEM AND METHOD

(75) Inventors: William E. Vallier, Bridgewater, NJ (US); Joseph R. Schlesier, West Orange, NJ (US); Andrew J. Bodart, Murray Hill, NJ (US); Matthew J. Wylie, Banking Ridge, NJ (US)

(73) Assignee: Accenture Global Services GmbH (CH)

( * ) Notice: Subject to any disclaimer, the term of this patent is extended or adjusted under 35 U.S.C. 154(b) by 1677 days.

(21) Appl. No.: 11/513,410

(22) Filed: Aug. 31, 2006

(65) Prior Publication Data

US 2008/0056459 A1    Mar. 6, 2008

(51) Int. Cl.
*H04N 7/173* (2006.01)
*H04M 1/64* (2006.01)
*H04M 11/00* (2006.01)
*H04M 11/10* (2006.01)

(52) U.S. Cl. ...... 725/109; 725/106; 725/133; 379/88.14; 379/88.17; 379/88.18; 379/88.25; 379/93.24; 379/93.25; 455/413

(58) Field of Classification Search .............. 725/106, 725/133; 348/14.04; 379/564, 88.14, 88.17, 379/88.18, 88.25, 93.24, 93.25; 455/413
See application file for complete search history.

(56) References Cited

U.S. PATENT DOCUMENTS

| | | | | |
|---|---|---|---|---|
| 5,414,773 | A * | 5/1995 | Handelman | 725/117 |
| 6,748,598 | B1 * | 6/2004 | De Bot | 725/133 |
| 6,882,709 | B1 | 4/2005 | Sherlock et al. | |
| 7,277,445 | B2 * | 10/2007 | Bartfeld et al. | 370/401 |
| 7,359,493 | B1 * | 4/2008 | Wang et al. | 379/88.23 |
| 7,571,458 | B1 * | 8/2009 | Eyal | 725/137 |
| 7,599,476 | B2 * | 10/2009 | Pantana et al. | 379/88.13 |
| 7,627,305 | B2 * | 12/2009 | Helferich | 455/403 |
| 7,746,989 | B2 * | 6/2010 | Mazor | 379/88.13 |
| 7,769,001 | B2 * | 8/2010 | Narasimhan et al. | 370/356 |
| 2002/0147988 | A1 * | 10/2002 | Nakano | 725/134 |
| 2003/0043260 | A1 * | 3/2003 | Yap et al. | 348/14.06 |
| 2003/0086432 | A1 * | 5/2003 | Bartfeld et al. | 370/401 |
| 2004/0052341 | A1 * | 3/2004 | Yeh et al. | 379/88.19 |
| 2004/0268404 | A1 * | 12/2004 | Gray et al. | 725/112 |
| 2005/0099491 | A1 * | 5/2005 | Miyata | 348/14.01 |

(Continued)

FOREIGN PATENT DOCUMENTS

WO    WO 00/44173    7/2000

OTHER PUBLICATIONS

Office Action, dated Aug. 20, 2008, for European Appl. No. 07 017 014.7-1525, filed Aug. 31, 2007 (3 pages).

(Continued)

*Primary Examiner* — Lisa Hashem
(74) *Attorney, Agent, or Firm* — Finnegan, Henderson, Farabow, Garrett & Dunner, L.L.P.

(57) ABSTRACT

Disclosed herein are inventions that integrate a home television set top box ("STB") or home media center with a smart voicemail system of a telephone service provider. Smart voicemail features, such as email notification of voicemails, or online playback of voicemails, may be used to obtain digital voicemail audio files that are then stored and maintained in a home computer network. These files can be served over the network via a networked television STB or a media center computer, to a display monitor during normal usage. Embodiments cause new voicemail notifications to be displayed during typical operation of a television with the STB or media center computer and provide users with an interface for responding to new voicemail notifications, and reviewing, managing, and playing back voicemail. Messages received thus can be easily identified and reviewed through an interface with which subscribers are extremely comfortable.

28 Claims, 6 Drawing Sheets

U.S. PATENT DOCUMENTS

| | | | |
|---|---|---|---|
| 2007/0039036 A1* | 2/2007 | Sullivan et al. | 725/133 |
| 2007/0115389 A1* | 5/2007 | McCarthy et al. | 348/461 |
| 2007/0121584 A1* | 5/2007 | Qiu et al. | 370/352 |
| 2008/0101559 A1* | 5/2008 | Bartfeld et al. | 379/88.17 |
| 2008/0109866 A1* | 5/2008 | Thomas et al. | 725/139 |
| 2008/0117826 A1* | 5/2008 | Qiu et al. | 370/242 |
| 2008/0165283 A1* | 7/2008 | Brandt et al. | 348/552 |
| 2009/0003540 A1* | 1/2009 | Zafar | 379/88.11 |
| 2009/0063645 A1* | 3/2009 | Casey et al. | 709/206 |
| 2009/0187956 A1* | 7/2009 | Sommer | 725/106 |
| 2009/0207984 A1* | 8/2009 | Lafreniere et al. | 379/88.23 |
| 2009/0258634 A1* | 10/2009 | Amine | 455/413 |
| 2009/0328118 A1* | 12/2009 | Ravishankar et al. | 725/106 |
| 2010/0043039 A1* | 2/2010 | Price et al. | 725/109 |
| 2010/0278534 A1* | 11/2010 | Leiden et al. | 398/67 |
| 2010/0279663 A1* | 11/2010 | Wang et al. | 455/413 |
| 2010/0281178 A1* | 11/2010 | Sullivan | 709/231 |
| 2011/0061083 A1* | 3/2011 | Bell et al. | 725/100 |
| 2011/0081892 A1* | 4/2011 | Graham et al. | 455/413 |
| 2011/0126258 A1* | 5/2011 | Emerson et al. | 725/133 |
| 2011/0145848 A1* | 6/2011 | Moskowitz et al. | 725/13 |
| 2011/0287746 A1* | 11/2011 | Gopinath et al. | 455/412.2 |
| 2012/0083248 A1* | 4/2012 | van Wyk et al. | 455/412.2 |
| 2012/0284741 A1* | 11/2012 | Shetty et al. | 725/25 |

OTHER PUBLICATIONS

Office Action, dated Aug. 27, 2009, for European Appl. No. 07 017 014.7-1525, filed Aug. 31, 2007 (3 pages).

European Search Report, dated Dec. 10, 2007, for European Appl. No. 07 017 014, filed Aug. 31, 2007 (2 pages).

* cited by examiner

VOICEMAIL INTERFACE SYSTEM AND METHOD

FIELD OF THE INVENTION

The present invention relates to systems and methods for integration of voicemail functionality with television programming interfaces. More particularly, the present invention relates to the integration of voicemail notification, retrieval, and management functionalities into television digital video recording set and other television top boxes and digital media player computer applications so as to provide a unified interface for entertainment and voicemail management.

BACKGROUND OF THE INVENTION

Voicemail is becoming an integral tool in everyday life for many people. Voicemail functionality comes free with most cellular telephone service, and is available as an add-on service for a small fee with traditional "plain old telephone service" (or "POTS").

Voicemail has certain advantages and drawbacks in comparison to the previous automated telephone messaging solution, namely, answering machines. Voicemail digitally records the message, thus providing a relatively high fidelity recording of the voice of the caller and the ability of the message to be easily stored and manipulated with telephone commands from the home or using a remote dial-in number. Conversely, many less expensive answering machines less optimally use microcassette tapes for recording the messages, providing lesser quality recording and making saving and replaying messages out of order problematic. Additionally, voicemail does not require an investment into special hardware that can break, and operates even when the user's home power is out or when the user receives but does not answer a call waiting telephone call.

One of the major drawbacks regarding voicemail, however, is that generally speaking users must remember to check their messages on a regular basis to see if the voicemail network has received new messages. Voicemail systems offered by POTS service provide a distinguishable dial tone, called a "stutter tone," if there are new voicemail messages when the user first picks up the telephone to place a call. With the proliferation of cellular telephones, however, users may infrequently utilize their home telephone to place outgoing calls, thus limiting their chances to notice the stutter tone. Furthermore, if only answering incoming telephone calls, a subscriber will not be given a chance to hear the stutter tone at all. While there are some telephone handsets that are adapted to detect the stutter tone automatically and provide a blinking light or other indication, these handsets require an investment in a new telephone by the subscriber. Thus, many voicemail subscribers are left with having to remember to pick up their telephone and listen for the stutter tone whenever they return home to check for new messages and oftentimes to not listen to the messages promptly.

Voice over Internet Protocol ("VoIP") is a relatively new service that competes with POTS providers. VoIP, which may also be referred to as IP Telephony, Internet telephony, Broadband telephony, Broadband Phone and Voice over Broadband, is the routing of voice conversations over the Internet or through any other IP-based network. Starting in approximately 2004, mass-market VoIP services over broadband Internet access services began to be market to the general public. VoIP subscribers make and receive calls as they would over the traditional publicly switched telephone network. VoIP services have gained in popularity as they commonly offer service plans with unlimited calling to the U.S., and some to Canada or selected countries in Europe or Asia as well, for a flat monthly fee. Various VoIP service providers in the United States include, for example, Vonage, Verizon VoiceWing, AT&T CallVantage, SunRocket, Lingo, NetZero, BroadVoice, America Online, Packet8, and Earthlink.

In order to further entice consumers to switch to VoIP telephone services from POTS, VoIP service providers have been introducing various innovative features to further attract subscribers. Currently, for example, many VoIP service providers offer "smart" voicemail services for free with a standard service plan. Such smart voicemail is an improvement on the voicemail services offered in conjunction with traditional POTS services in that it takes advantage of the fact that all subscribers will have a connection to the Internet, and thus permits subscribers to access and interface with their respective mailboxes from anywhere over the Internet. Thus, subscribers still can access their smart voicemail box in the conventional dial-in manner with their telephone, but also can access and manage their voicemail messages through email accounts and online web interfaces.

For example, certain smart voicemail systems allow subscribers to access their voicemails through a web account and play them back through any Internet connected computer. Other smart voicemail systems provide subscribers with the option of having an email or instant message sent to the subscriber as a notification every time a new voicemail is received. Some services even provide subscribers with the further option of having the voicemail message attached as a digital audio file to the notification email actual message.

Understandably, these voicemail notification and access features offered by smart voicemail boxes are an improvement over the "stutter tones" used by traditional voicemail services. Nevertheless, they still require a user to check their computer for new emails or instant messages, which many persons may not find convenient. A voicemail subscriber that, for example, simply comes home and relaxes in front of the television for a few hours before heading off to bed, would have a high probability of not retrieving voicemail messages until they are stale.

Thus, there remains a need in the art for improved mechanisms for voicemail service subscribers to receive notifications of new voicemail messages. It would be advantageous if such systems and associated methods were capable of communicating new message notifications in a manner that would easily integrate into the daily life of the subscriber without requiring the subscriber to actively remember to check their voicemail. Further, it would be advantageous if such systems would also provide an improved interface for voicemail retrieval, review, and management by subscribers.

SUMMARY OF THE INVENTION

In light of the above needs, it is an object of the present invention to provide methods and systems for providing subscribers to smart voicemail systems with voicemail notifications that do not require them to actively check for new messages.

Additionally, it is an object of the present invention to provide systems and methods that provide voicemail notifications while the subscriber is watching live/recorded television or engaging in other entertainment activities with home media centers.

Furthermore, it is an object of the present invention to provide systems and associated methods for providing a simple unified interface for voicemail subscribers to review and manage voicemail messages.

To achieve these and other objects, the present invention comprises systems and associated methods that permit an integration of a home television set top box or home media center with a smart voicemail system of a telephone service provider, such as those types of smart voicemail systems currently provided by many VoIP service providers. In particular, embodiments of the present invention utilize smart voicemail features, such as email notification of new voicemails, online playback of voicemails over the Internet, or both, to obtain digital voicemail audio files that are then stored and maintained in the home computer network of the user. Such stored voicemail audio files are then served over a local network, via either a networked television STB or a media center computer, to a display monitor during normal usage of the display monitor. Preferably, the display monitor is a television and the systems of the present invention cause new voicemail notifications to be displayed during typical operation of the television with the set top box or media center computer.

In the various embodiments of the present invention, the systems and associated methods also provide users with an interface for responding to new voicemail notifications, and reviewing, managing, and playing back new or old voicemail messages.

In this manner, the voicemail messages received by a VoIP, POTS, or cellular telephone smart voicemail subscriber can be easily identified and reviewed by a customer through an interface with which they are extremely comfortable—their television. Subscribers are not required to pick up their telephone or call a voicemail dial-in number to identify whether new voicemail messages have been received. Instead, they are provided with simple yet highly effective notifications when using their television or home media center in the normal course of day-to-day life. Users can review voicemail messages at their leisure while watching television, such as during commercials or the like.

Additionally, certain preferred embodiments of the present invention may be adapted to consolidate voicemail messages from multiple smart voicemail boxes into a single interface that can be used from the home. Thus, users of systems of the present invention can see whether they have received voicemail messages on their cellular telephone(s), at work, or at home through a unified interface.

In this regard, a first aspect of the present invention relates to an electronic system for providing an interface with a remotely located smart voicemail network. The electronic system comprises computing means for obtaining voicemail message files from the voicemail network. The computing means operate a file storing applet adapted to electronically collect newly received voicemail message files from the voicemail network into a designated file folder. The system also includes network connection means for providing electronic communication between the computing means and the voicemail network, and a computing applet operable to interface with the file storing applet and create mechanisms for users to be notified of the collected voicemail message files and to interact with the collected voicemail message files. The system further includes an output device for visually displaying notification indicia and audibly playing the voicemail message files, and means for delivering selected voicemail message files from the designated file folder to the output device upon a user command. The computing applet and the file storing applet operate collectively to handle notification of, playing of, and management of the voicemail message files so as to provide a unified interface for entertainment and voicemail management.

Further, a second aspect of the present invention relates to a method for providing an interface with a remotely located smart voicemail network via a home entertainment system. The method includes establishing a voicemail box with the smart voicemail network, and identifying when one or more incoming voicemail messages are received in the voicemail box. The method continues by collecting one or more voicemail message audio files corresponding to the incoming voicemail messages from the voicemail network, and storing the one or more audio files in a file folder designated for new voicemail message audio files. The method further includes monitoring the file folder designated for the new voicemail message audio files to identify when the storing occurs, and generating a visually detectable notification indicia on an electronic display upon identifying one or more stored audio files. Further, the method includes audibly playing the via the home entertainment system upon a user command prompted by the visually detectable notification indicia.

Additionally, a third aspect of the invention includes an electronic system for providing a television interface with a remotely located smart voicemail network adapted to send new voicemail messages as audio file attachments in email notification messages. The electronic system comprises a television, and a computer connected to the Internet and configured to receive email messages from the voicemail network. The computer has a file storing applet running thereon that is adapted to identify email messages received from the voicemail network. Additionally the system includes a set top box operable to control the operation of the television and networked with the computer. The file storing applet detaches and stores audio files from each the incoming voicemail notification messages into a designated file folder, and the set top box has a user interface applet running thereon that monitors the file folder to identify the presence of new audio files in the file folder and causes notification indicia to be displayed by the set top box on the television upon identifying the presence of new audio files so as to provide a unified interface for entertainment and voicemail management.

The various embodiments of the invention having thus been generally described, several illustrative embodiments will hereafter be discussed with particular reference to several attached drawings.

DETAILED DESCRIPTION OF THE PREFERRED EMBODIMENTS

The various preferred embodiments of the invention will be described hereafter with respect to the inventive elements that permit an integration with a smart voicemail system of a VoIP telephone service provider. It should be readily appreciated by one skilled in the art, however, that the embodiments of the invention can likewise be implemented with voicemail systems provided by traditional POTS providers or cellular telephone service providers. In particular, embodiments of the present invention can be readily adapted to operate in conjunction with voicemail systems of POTS or cellular telephone service providers so long as smart voicemail features, such as email notification of new voicemails and/or online playback of voicemails over the Internet, are available.

Figure 1A:
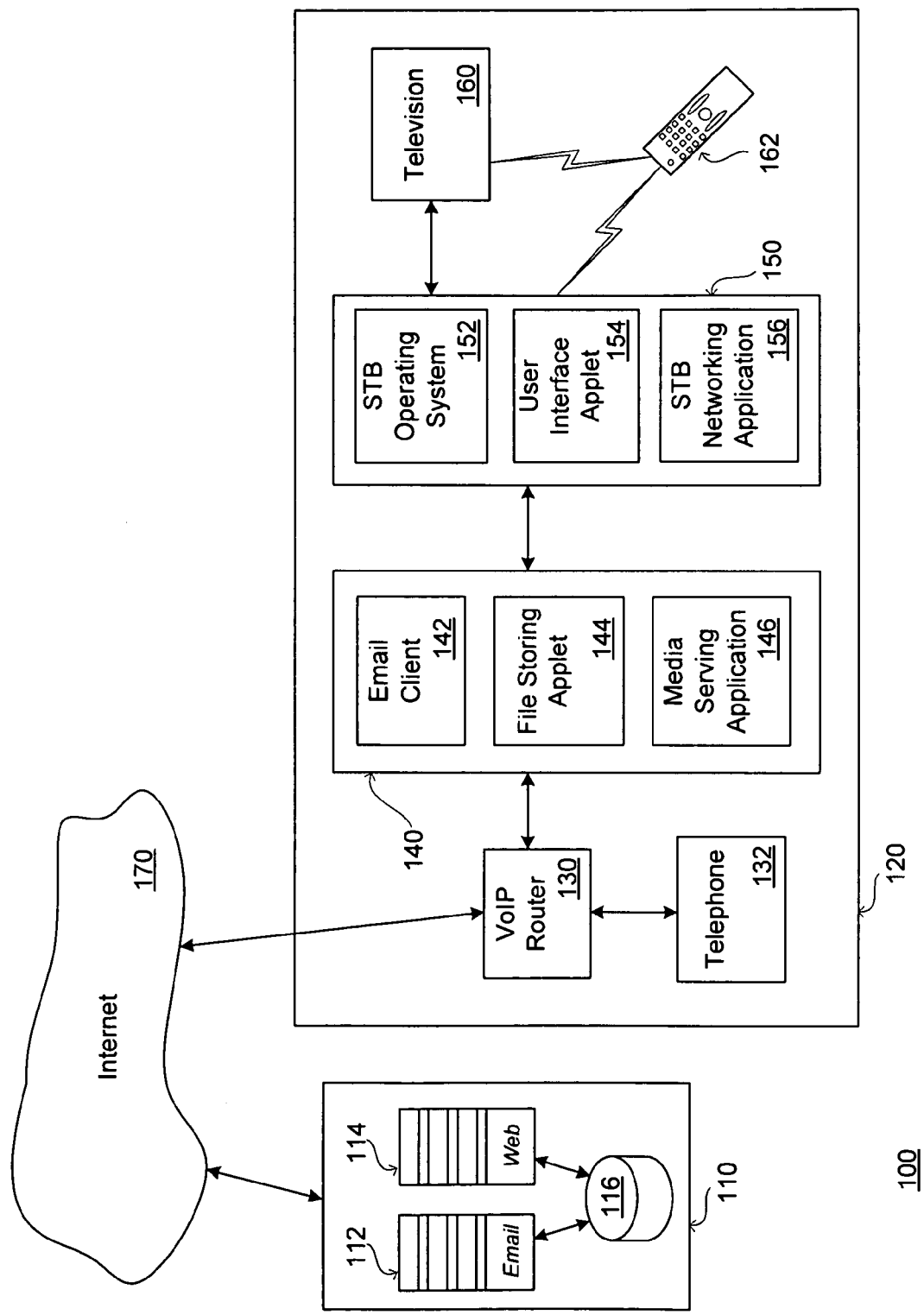
FIG. 1a is a schematic diagram showing a voicemail interface system adapted for use with a digital set top box for receiving television signals according to an embodiment of the present invention.

In particular, FIG. 1a schematically depicts a voicemail interface system 100 adapted for use in integrating an electronic set top box ("STB") 150, typically used for receiving television signals in the home 120 of a person, into a first embodiment of the invention. Understandably, the STB 150 can comprise a digital cable STB used for receiving and decoding/playing cable television signals, a digital satellite service ("DSS") STB used for receiving and decoding/playing DSS television signals, a digital video recording ("DVR") or personal video recording ("PVR") STB, such as those offered commercially under the trade names TiVo, ReplayTV, UltimateTV, and SONICblue, and combinations thereof. For example, many cable and DSS television service providers currently offer various proprietary STBs for decoding their programming signals that also internally integrate the function of a DVR or PVR (collectively referred to hereafter as "DVR"), providing the user with only a single STB that incorporates the full functionality of the DVR with a receiver STB. In most preferred embodiments of the present invention as described hereafter, however, the STB 150 comprises a DVR STB or cable/DSS STB with integrated DVR functionality, such as those that operate using the TiVo operating system.

A preferred STB 150 typically would include a computing means, typically in the form of a high speed microprocessor, running a STB operating system 152, and, in the case of an integrated STB-DVR, a large capacity hard disk or other persistent electronic storage. STB 150, of course, may also include, for example, suitable memory, video controllers, and the like, to enable the STB to be capable of receiving and interpreting over the air ("OTA"), cable, or DSS television programming signals (e.g., including embedded interactive program guide data and other administrative data) and sending appropriately formatted audio and/or video signals to a connected television 160.

Television 160 can, of course, be any type of television that is compatible with the STB 150, and could be integrated with other output elements, such as home theater audio receivers and a surround speaker system. It will be well within the ordinary skill of one in the art to understand how to integrate television 160 and other output elements with the STB 150, such as with coaxial, composite, s-video, component video, HDMI, DVI, optical, or other suitable standard or high definition video cabling or analog or digital audio cabling.

Also as depicted in FIG. 1a, the home 120 receives combined Internet service and telephone service from a VoIP telephone service provider via a VoIP router 130 attached to their home personal computer 140 and telephone 132. In embodiments of the present invention, it is preferred that the Internet service provides a high speed broadband connection, such as T1, DSL, cable modem, and the like. As noted above, it is of course possible, but less preferred, to adapt the embodiments of the invention as herein described to operate with dial-up Internet service over POTS lines. VoIP router 130 operates similarly to a conventional computer router, keeping the attached computer 140 connected to the Internet 170 at all times, which, understandably, makes such broadband connections superior to a dial-up connection irrespective of connection (upload/download) speeds.

The home computer 140 contains normal networking applications, peripherals, and hardware as is known in the art for a home computer, including an electronic processor, memory, storage, and installed operating system and applications software. Preferably, the computer 140 contains an Ethernet port, wireless Ethernet card (or router or access point) or the like that enables it to communicate over local area network ("LAN") protocols with VoIP router 130 (and thus the Internet 170) and other network elements. Home computer 140 also has installed thereon an email client application 142 (such as, e.g., Microsoft Outlook, AOL, Lotus Notes, or other suitable email clients).

Since home 120 utilizes a VoIP service that offers smart voicemail box capabilities, including one or both of email notification of new voicemail messages and online web access to review and listen to received voicemails, the VoIP service provider's voicemail network 110 is also depicted in FIG. 1a. Voicemail network 110 contains a voicemail storage database 116 for storing and managing the various voicemail messages received by the VoIP service provider's various subscribers, an email server 112, and a web server 114. The email server 112 is utilized to send a voicemail notification as an email message via the Internet whenever a new voicemail message is received for a given subscriber (when that functionality is so configured by the subscriber) to an email address specified by the subscriber. Most smart voicemail services that provide a capability for subscribers to receive email notification messages also permit subscribers to further configure these notification messages to attach the actual voicemail in question as a digital audio file (such as a .wav, .mp3, or like audio file) to the email message. In this manner, the subscriber could open the voicemail message using his email client and listen to it immediately upon receiving the email notification message, and/or save and listen to it at a later time. In preferred embodiments of the invention as depicted in FIG. 1a, email server 112 is configured to send voicemail notification email messages that contain digital audio file attachments of a voicemail whenever a new voicemail message is received for the subscriber in question.

Web server 114 of voicemail network 110 likewise is adapted to provide smart voicemail functionality to subscribers. In particular, web server 114 is in electronic communication with voicemail storage database 116 and provides online web access for subscribers to perform voicemail review, management, and listening functions over the Internet 170 (such as by using a conventional web browser or other Internet communication applications to access a secure web site, as is known in the art).

As noted above, home computer 140 is connected to the Internet 170 via VoIP router 130, and is running an email client application 142 so that it preferably may receive new emails, including voicemail notification emails, at any time.

In certain embodiments of the invention such as the one depicted in FIG. 1a, home computer 140 also has stored and running thereon a file storing applet 144, which is an application that, in embodiments where voicemail notification emails are used, runs in conjunction with the email client application 142 and is operable to identify and manage incoming voicemail notification emails received from the voicemail network 110.

In particular file storing applet 144 will interface with the email client application 142 to recognize incoming messages from the voicemail network 110 (such as by identifying the originating address of the email), parse any voicemail identification information or other metadata out of the email (such as caller ID, time of message, and/or length of message), and immediately copy any attached voicemail files to a predetermined file folder used to store received voicemail messages that are marked as "new." Thus, client file storing applet 144 may take advantage of the voicemail notification email functionality of smart voicemail boxes to populate a local folder on home computer 140 with incoming voicemail messages. Freeware or custom developed applications can be installed on the home computer to automate the email identification, parsing, and detaching functions of the file storing applet 144 as described herein. For example, a freeware application called EZDetach is publicly available that, when installed on a computer using the Microsoft Outlook email client application, enables users to define specific email handling functions, including the automatic parsing of emails from certain senders and the detaching and saving of email attachments.

Alternatively or additionally, client file storing applet 144 may not identify voicemails by taking advantage of voicemail notification email messages but rather by periodically logging in over the Internet 170 into a web site of web server 114 to check for and download new voicemail messages (if present). This alternative configuration could be useful for a variety of reasons. For example, a voicemail network 110 could potentially offer only online access to voicemails, but not notification emails. Alternatively, a user could prefer that his email not be cluttered with notification emails or could prefer to not install an email client on his computer. The operation of the file storing applet 144 according to these alternative approaches will be described further below.

Finally, home computer 140 also includes a media serving application 146. Media serving applications are common, and generally are capable of playing various types of digital multimedia content, such as music CDs, DVDs, digital video files, and digital audio files, on the computer or serving that content over LAN to networked electronic devices, such as other appropriately networked computers or other electronic devices capable of receiving and playing the digital content. Most media serving applications are capable of operating in a "push" mode, whereby the user initiates playback directly from the computer running the serving application, or in a "pull" mode, whereby the serving application is capable of beginning playback of content upon receiving a request from other networked devices running a complimentary networking application.

In the embodiments of the invention as depicted in FIG. 1a, the STB 150 is networked to the home computer either directly as depicted, or through LAN enabled means, such as via the VoIP router 130, other computing routers, switches, or wired or wireless LAN means. Many STBs available on the market today, including most with DVR functionality, are distributed with Ethernet ports built in, or have commercially available networking (wired or wireless) adapters that can be purchased so as to enable them to be networked in this manner.

Installed on the STB 150 is a user interface applet 154 adapted to interact with and add voicemail functionality to the standard functions offered by the STB operating system 152 software. Interface applet 154 thus permits integrated operation by the STB with the home computer 140 by making various changes to the standard user interface of STB 154. Applet 154, for example, could add various menu items to standard menu trees offered by the standard operating system 152 that are selectable by a user via a remote control 162 or other means while watching television 160.

Additionally, STB 150 has installed thereon a STB networking application 150 that permits it to communicate over various internet protocols with the media serving application 146 running on home computer 140. The user interface applet 154 adds commands and associated user interface displays into the standard user interface supported by the STB operating system 152 to allow a user to receive voicemail notifications, to perform voicemail commands, and to listen to and manage voicemail folders in cooperation with STB networking application 156 and media serving application 146 as will be described further below.

For example, it is known that TiVo brand DVR STBs have a core operating system, known as HME, that is relatively open and for which there is a commonly available software developer kit ("SDK") to enable third parties to create such applications. This SDK is released under the common public license, and thus there are various applications that are commonly available for interacting with and expanding the functionality of TiVo brand DVRs in this manner. For example, the well known freeware application Galleon, when installed into networked TiVo DVRs, allows those DVRs to interact with a co-networked personal computer and create a media serving connection such that media files can be readily shared between the DVR and the personal computer. Thus, it will be well within the ordinary skill of one skilled in the art to create and/or integrate suitable user interface applets, STB networking applications, and media serving applications to perform the specific functions as described herein.

Figure 1B:
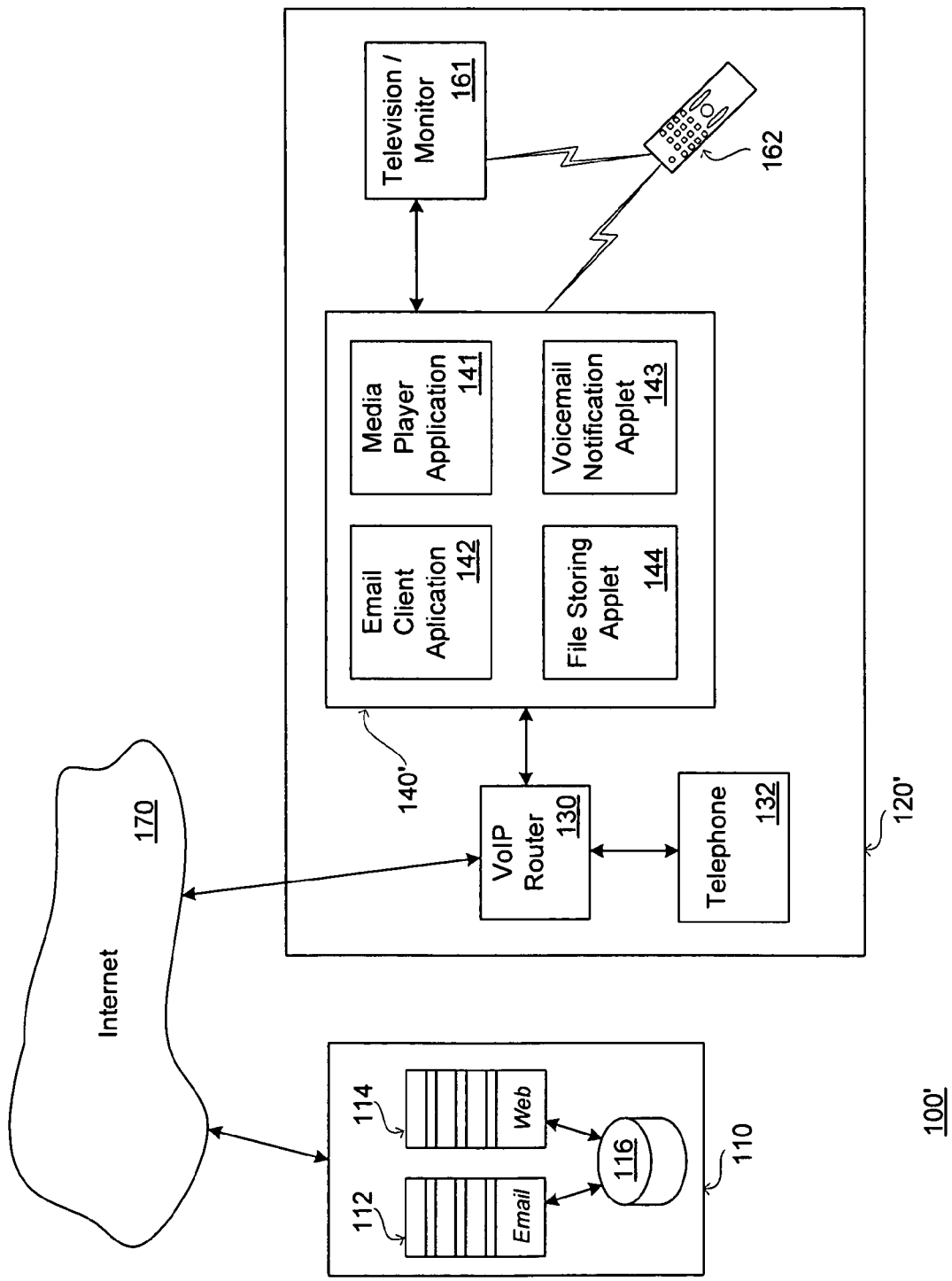
FIG. 1b is a schematic diagram showing a alternative voicemail interface system adapted for use with a computer utilized as a media center for receiving and/or playing television and other audio/video signals according to an embodiment of the present invention.

Turning now to FIG. 1b, there is depicted schematically an alternative configuration of a voicemail interface system 100' adapted for use with a computer that is utilized as a media center for receiving and/or playing television and other audio/video signals on a television or computer monitor 161 according to another embodiment of the invention. Generally, voicemail interface system 100' of FIG. 1b is substantially similar to voicemail interface system 100 of FIG. 1a. In FIG. 1a and FIG. 1b, like reference numerals for depicted elements (e.g., remote control 162, or voicemail network 110) indicate like elements of systems 100 and 101'. Thus, for purposes of brevity, the present discussion of FIG. 1b will focus upon the differences between systems 100 and 100'.

Notably, system 100' does not incorporate a separate STB associated with a television, but rather is an embodiment of the invention that will work best for users that desire to use a personal computer in their home as a media center computer. Media center computers generally are relatively high powered multimedia personal computers that have one or more media playing applications installed on the computer and have hardware specially adapted to provide high performance with respect to bandwidth-heavy multi-media processing, such as video accelerator and sound processing cards, television tuner cards, and high capacity and speed memory and storage. For example, Windows XP Media Center Edition ("MCE") is a well known comprehensive media player application that allows users to play music CDs, DVDs, and digital music and video on their computer (either on a standard computer monitor or attached television). MCE also supports television tuner cards to enable the media center computer to record, store, and replay television programming to emulate DVR functionality. For example, the TV Wonder line of television tuner cards produced by ATI Technologies can be utilized in personal computers to convert home computers for media center purposes by adding television tuning and DVR capabilities.

In this regard, home 120' utilizes a media center computer 140' connected to the Internet over the VoIP router 130, similar in manner to home computer 140 described above. Media center computer 140' includes an email client application 142 and file storing applet 144, also similar to those described above. Media center computer 140' also has a media center application stored thereon, such as, for example, Windows MCE, that enables the playback of audio and video content and, preferably, live or recorded television content.

Finally, media center computer 140' includes a voicemail notification applet that is adapted to identifying new voicemail audio files (e.g., placed by the file storing applet 144 in an appropriate "new voicemail" folder) and then generating appropriate notifications to be played on the television/monitor 161. This applet 143, similar to applet 154 in system 100, interacts with and adds voicemail functionality to the standard functions offered by the operating system of the media center computer 140' and the media player application 141. User interface changes, such as new selectable menu options or icons that display on the corner of the screen when new voicemails are received, are initiated by notification applet 143. The operation of voicemail notification applet 143 and its interaction with various other elements of media center computer 140' will be understood further after considering the more detailed description of various processes that follows.

Turning now to FIG. 2 through FIG. 5, there are depicted flow diagrams of various processes that utilize systems according to the present invention to provide improved voicemail interfaces according to different preferred embodiments of the present invention. These processes are intended to assist one of ordinary skill in the art in understanding the interrelation of various steps in accordance with certain aspects of the present invention. It will be appreciated by those of ordinary skill in the art that unless otherwise indicated herein, the particular sequence of steps described is generally illustrative only and, where apparent, can be varied without departing from the spirit of the invention. Thus, the steps can be performed in any convenient or desirable order. Further, while not explicitly depicted, it will be understood by one skilled in the art that various ones of the steps below are meant to be repeated regularly in order to maintain current data.

Figure 2:
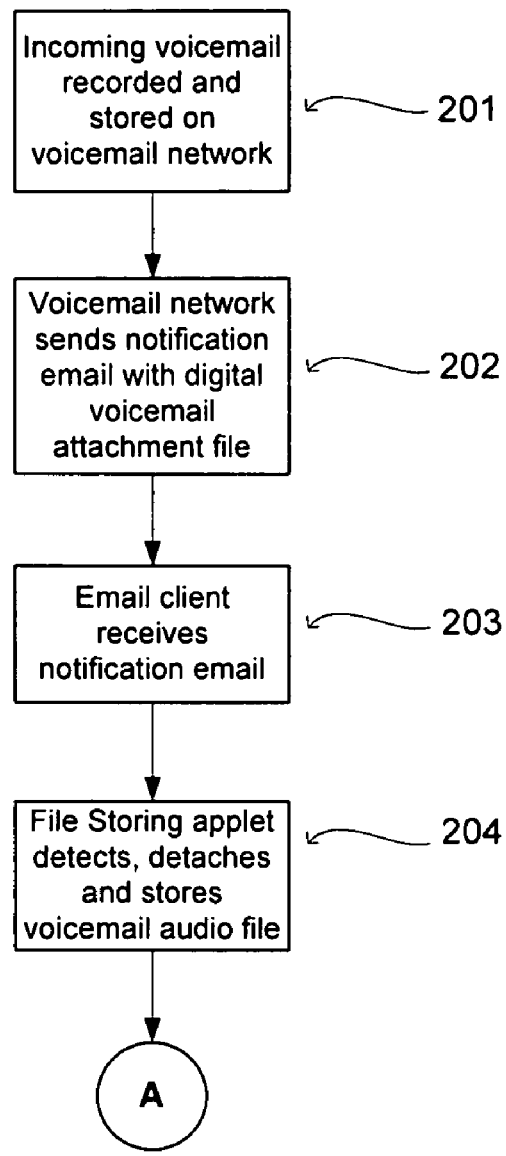
FIG. 2 is a flow diagram showing a voicemail collection process enabled by certain systems according to embodiments of the present invention to obtain new voicemail messages from a digital voicemail inbox.

Referring first to FIG. 2, there is depicted a voicemail collection process 200 enabled by certain systems according to embodiments of the present invention to obtain new voicemail messages from a digital voicemail inbox. Process 200 is intended to illustrate the various steps of operation of either system 100 or system 100' in the situation where voicemail notification emails generated by the voicemail network are used to collect new voicemail messages.

As depicted, collection process 200 is initiated with a new incoming voicemail being received and stored in a local voicemail storage database by the voicemail network. Due to the configuration settings selected by the recipient voicemail service subscriber, the voicemail network immediately generates and sends a voicemail notification email to the email address stipulated by that subscriber. This email contains the voicemail message in question as an attached audio file, and preferably also provides certain identification information concerning the voicemail, such as time received, caller ID, and length of recording.

Next, at step 203, the email client on the subscriber's home computer, which client is associated with the email address stipulated by the subscriber, receives the voicemail notification email message sent by the voicemail network. The file storing applet, which is running concurrently with the email client, detects the email from the voicemail network, detaches the voicemail message audio file, and stores the audio file message at step 204. Step 204 thus concludes voicemail collection process 200.

In preferred embodiments of process 200, step 204 stores newly received voicemail messages in a folder within the hard drive of the subscriber's personal computer that is running the email application (or some other networked storage means). In particular, the folder could be a part of a plurality of folders that is used exclusively by the file storing applet. For example, one folder could contain only new messages (or messages that the user opts after listening to them to maintain their new status), another folder messages that are maintained in an inbox even though they are not labeled as "new," and various other folders that can be established by the user to store older messages according to various categories or topics.

Figure 3:
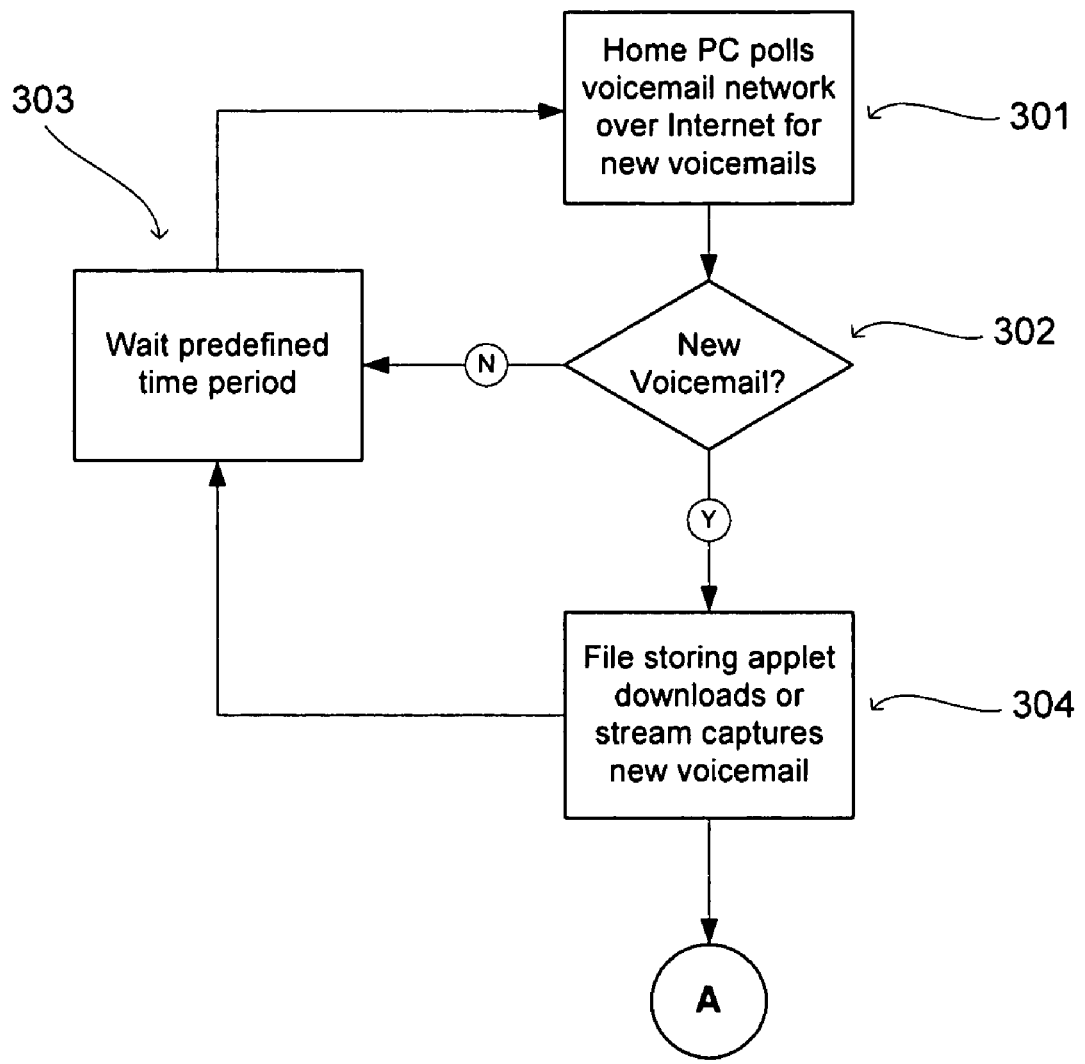
FIG. 3 is a flow diagram showing an alternative voicemail collection process enabled by certain systems according to embodiments of the present invention to obtain new voicemail messages from a digital voicemail inbox.

FIG. 3 depicts an alternative voicemail collection process 300 enabled by certain systems according to embodiments of the present invention to obtain new voicemail messages from a voicemail network where voicemail notification email functionality is not available or otherwise used. In this regard, it can be seen in FIG. 3 that voicemail collection process 300 is a repetitive process that runs in the background of the subscriber's home personal computer. At step 301, the home personal computer connects to the voicemail network over the Internet, and "polls" the web system of the voicemail network to check whether new voicemail messages are present for the subscriber. In this embodiment, the file storing applet would be configured to connect to the Internet and automatically log into the web interface offered by the voicemail network to check the voicemail inbox of the subscriber for the presence of any voicemails marked as "new" (this checking sub-step being depicted by determination 302 in FIG. 3).

As shown, if it is determined that no new voicemails are present, the file storing applet waits for a predefined time period at step 303 before again repeating step 301 and determination 302. The time period waited between iterations can, of course, vary. While a shorter time period would mean less lag time for a subscriber to receive notification of new voicemails through systems of the present invention, practical considerations (such as a limit concerning the number of times a particular subscriber can log in to the web interface of the voicemail network) may dictate that the polling operation can take place only once every fifteen minutes or even less frequently. Similarly, process 300 can be configured to check for new voicemails at different intervals depending upon time of day, day of the week, or if it is detected that a user is currently using a STB or media center computer utilized in the systems.

However, if it is determined that one or more new voicemails are present, process 300 proceeds to step 304 where the file storing applet obtains a copy of and stores the new voicemails as appropriate. This step can, of course, be performed in a variety of manners. The applet could simply download the audio file and associated metadata (caller ID, etc.) if permitted by the voicemail network, or could initiate playback of the voicemail file over the Internet and initiate a streaming audio capture session in order to create a local copy of the audio file that is stored in the appropriate folder on the home computer or media center computer.

It should be readily appreciated by one skilled in the art that process 300 can modified to use in situations where users can obtain electronic notifications of new voicemails from the voicemail network, but where they cannot automatically receive copies of the subject voicemail message as attachments via notification emails. For example, in the situation where the voicemail network will send a notification message, but without a voicemail attachment, this notification message can be identified by the file storing applet and used as a trigger to cause it to connect to the Internet and perform equivalent functions as described above for steps 301 and 304. Similarly, it is commonplace for voicemail networks to provide audible stutter tones, as opposed to a conventional dial tone, when the subscriber first picks up his telephone if newly received voicemails are present. The file storing applet thus could be adapted to monitor a telephone line to detect the stutter tone and use that as a trigger to cause it to connect and download the new voicemail files as described above. Understandably, in such alternative embodiments it would be unnecessary for process 300 to include determination 302 and waiting step 303 and would avoid the need to have the home computer repeatedly poll the voicemail network.

Additionally, as noted above, each voicemail file can optionally be associated with various different types of metadata, including caller ID information, time of message receipt, length of message, and the like. This metadata is preferably retained by the file storing applet at steps 204 and 304. This can be done by, for example, embedding this information in the file name assigned to each voicemail message, or be compiling and updating a flat file associating voicemail message names with metadata. This retention can enable voicemail notification applet 143 and user interface applet 154, for example, to display the metadata to the user when a new message notification is communicated to the user, or in other management interfaces and menus to help the user decide whether to listen to the message, delete it, save it to a folder, and the like.

Figure 4:
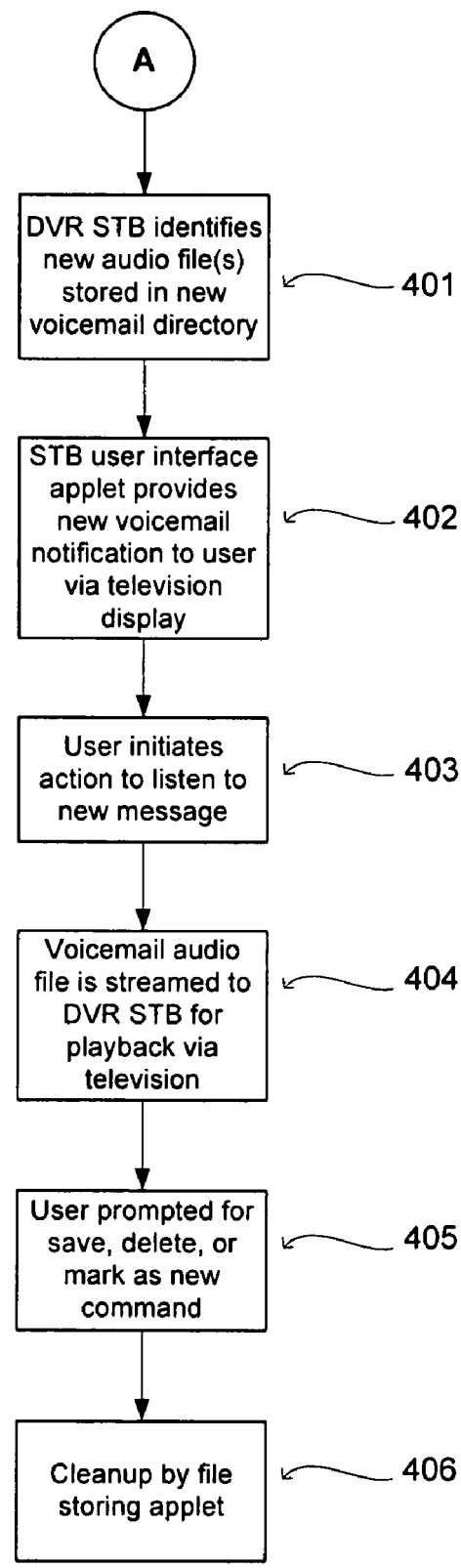
FIG. 4 is a flow diagram showing a voicemail interaction process enabled by certain systems according to embodiments of the present invention to provide user notification of and interaction with new voicemail messages.

The various mechanisms of collecting voicemail message audio files from a voicemail network having been thus described, different mechanisms for interacting with the collected voicemail messages using systems of the present invention will now be described. Depicted in FIG. 4 is a flow diagram for a STB voicemail interaction process 400 enabled by certain systems according to embodiments of the present invention. Process 400 illustrates the various exemplary steps for users receiving notification of and then interacting with new voicemail messages using certain systems of the present invention, such as system 100 of FIG. 1a.

As shown in FIG. 4, the STB voicemail interaction process 400 starts with the user interface applet stored on the STB identifying at step 401 one or more new voicemail messages stored on the home computer in the folder specifically designated for the files storing applet to store such new messages. The identifying step 401 is a polling operation that monitors the file structure of the home computer to identify when new files have been added the new message folder. Similar in manner to the polling actions described above with respect to FIG. 2, step 401 entails the STB regularly sending and receiving signals over the networking connection to the home computer to see whether new voicemail audio files have been added to the folder in question. It should be readily apparent to one skilled in the art that either one of processes 200 or 300 (or both) can be used prior to process 400 (as indicated by the circle labeled "A" following steps 204 and 304 and preceding step 401) as identifying step 401 will monitor through this polling operation the same voicemail file folder in any event.

After identifying one or more new voicemail audio files at step 401, STB voicemail interaction process 400 then provides a new voicemail notification at step 402 to the user via the television display. During step 402, the user interface applet can provide notifications to viewers in various desirable manners that are incorporated into the standard user interface provided by the STB's operating system. For example, many STB operating systems display programming description banners automatically when certain operations are performed, such as changing the channel. These programming banners typically identify the channel, program name, brief description, time of program (if a DVR, whether the program is being recorded), and the like. The user interface applet thus could display a particular icon on the programming description banner to indicate that new voicemail messages are present. Additionally, such an icon could be displayed when the user operates any interactive program guides or menu systems supported by the particular STB operating system. Additionally, with respect to DVR type STBs in particular, the user could be provided a list of new voicemails along with recorded television programming when they review their recorded program list.

Next, at step 403, the user initiates an action to begin listening to one or more of his new voicemail messages. This could comprise, for example, the user performing an operation with their remote control to select any one of the displayed "new voicemail" icons, navigating to a voicemail display page using the menu system of the STB, or any other suitable computerized interface and/or navigation paradigm. Such a voicemail display page, for example, could appear very similar to the interface of common email client applications or DVR recorded programming lists, with messages being displayed vertically in chronological order, icons being used to indicate the status of the messages (e.g., new, old, scheduled for deletion, etc.), and metadata (e.g., timestamp of receipt, caller ID, length of message) displayed next to the icons to help identify the particular voicemail message. The user could then navigate up and down this listing to select a particular voicemail (i.e., in the this case, one of the new voicemails) for playback using the remote control.

Regardless of how the user does so, after the user initiates the playback action at step 403, the user interface applet of the STB uses the STB networking application to interact with the media serving application on the home computer and begin playback of the selected voicemail audio file. This can be done, for example, by the media serving application starting a streaming audio session that can be received and played through the television by the networking application.

After listening to a message (or just messages marked as new), the user could be prompted by the user interface applet regarding how it should handle that particular voicemail audio file at step 405. This could include, for example, the user being provided with the options of "Save this message to folder.", "Delete this message", "Mark as new", and "Keep message in inbox", and being required to make an appropriate selection before other operations (listening to or managing other voicemail messages, returning to television programming, etc.) could be performed on the STB.

Thereafter, at step 406, the file storing applet begins a cleanup operation based upon input from the user received at step 405. If the user opts to delete the message at step 405, the file storing applet would receive an indication of this command at step 406 and delete the audio file accordingly (or, e.g., move it to a "deleted messages" folder). Likewise, the file storing applet could alternatively move the voicemail audio file in question to other folders, such as to a particular saved messages folder selected by the user, or to a folder containing previously played messages that are maintained in the main inbox. Moving or deleting the voicemail message from the new messages folder would understandably stop that particular audio file from triggering the new voicemail notification described with respect to step 401 above.

Figure 5:
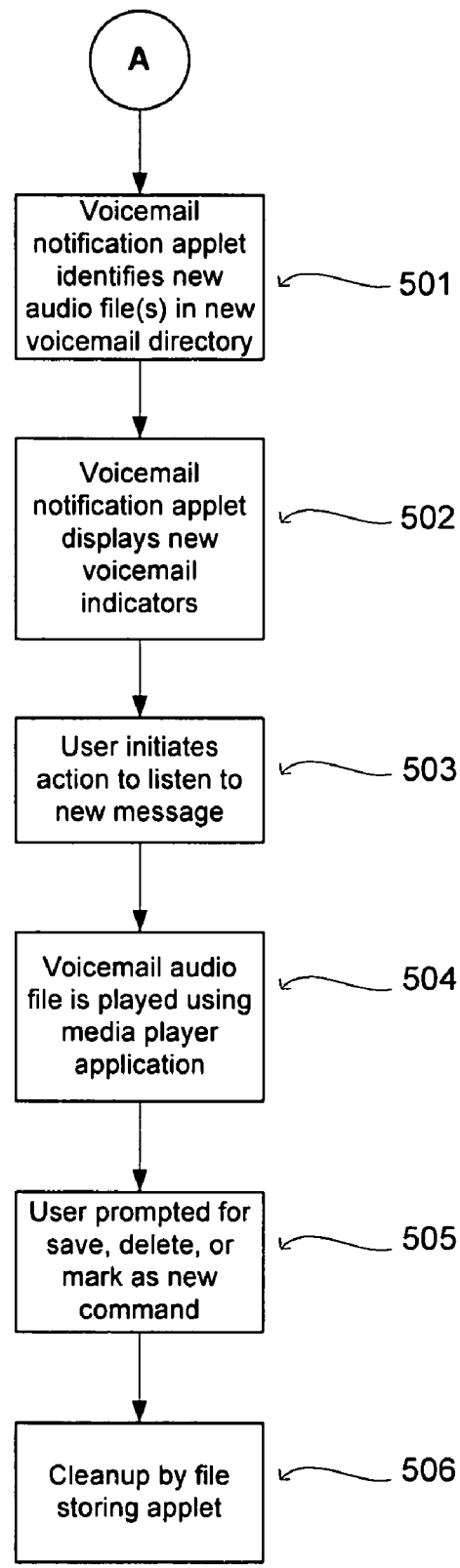
FIG. 5 is a flow diagram showing an alternative voicemail interaction process enabled by certain alternative systems according to embodiments of the present invention to provide user notification of and interaction with new voicemail messages.

Turning now to FIG. 5, there is depicted in flow diagram format an alternative voicemail interaction process 500 utilized by systems according to embodiments of the present invention that do not utilize separate STBs, such as system 100' of FIG. 1b. Like process 400, process 500 operates in very similar fashion to provide user notification of and interaction with new voicemail messages. Additionally, like process 400, process 500 as depicted can be utilized in combination with either one of processes 200 or 300 (or both).

The voicemail interaction process 500 starts with the voicemail notification applet running on the media center computer identifying at step 501 one or more new voicemail messages appearing in the folder designated for the file storing applet to store new messages. Like step 401 described above, step 501 can be implemented as a polling operation that monitors the file structure of the new messages folder to identify when new files have been added.

When a new voicemail audio file is identified, next at step 502 a new voicemail notification to the user is created. The media center computer is attached either to a television or computer monitor, and the voicemail notification applet causes an appropriate indication to be conveyed to the user via the user display. Like step 402, this notification at step 502 can be achieved in a variety of manners. If the user is using the media center computer for live/recorded television or other media viewing, icons can be displayed on programming description banners, interactive program guides, stored media lists (e.g., recorded programs, music libraries, etc.), pop up windows, in the task bar tray, within menu trees, or the like.

Next, at step 503, the user initiates an action to begin listening to one or more of his new voicemail messages. This step operates in similar manner to step 403 described above. After the user initiates the playback action at step 503, the voicemail notification applet sends a command causing the media player application to begin playback of the selected voicemail audio file.

After listening to a new message, the user could be prompted by the voicemail notification applet regarding how it should handle that particular voicemail audio file at step 505, and then the user response would cause the file storing applet at step 506 to take appropriate cleanup actions. These two steps would operate substantially the same as steps 405 and 406 as described above.

In this manner, the voicemail messages received by a VoIP, POTS, or cellular telephone smart voicemail subscriber can be easily identified and reviewed by a customer through an interface with which they are extremely comfortable—their television. Subscribers are not required to pick up their telephone or call in to the voicemail network to identify whether new voicemail messages have been received and are provided with simple yet highly effective notifications when using their television or home media center.

Additionally, certain preferred embodiments of the present invention may be adapted to consolidate voicemail messages from multiple smart voicemail boxes into a single interface that can be used at home. Thus, users of systems of the present invention can see whether they have received voicemail messages on their cellular telephone(s), at work, or at home through a unified interface.

It will be readily appreciated by one skilled in the art that various processes of the methods described herein may be implemented using software stored in the memory for execution by suitable processors. Alternatively, the computing devices may implement such processes and methods in hardware or a combination of software and hardware, including any number of processors independently executing various programs and dedicated hardware, such as application specific integrated circuits (ASICs), field programmable gate arrays (FPGAs), and the like. Additionally, it will be appreciated that the various preferred embodiments described herein identify only one software architecture suitable for achieving the functionality and implementing the processes described. In light of the present specification, other software architectures are evident that will operate equivalently, such as by, for example, combining applets or applications into single programs or separating them into various different interacting programs. Additionally, it should be apparent that the applets described herein can be installed as patches to the operating system and other applications on the various electronic devices, as independent programs, or in any other suitable manner.

Having described preferred embodiments of the invention, it will now become apparent to those of ordinary skill in the art that other embodiments incorporating these concepts may be used with the incorporation of insubstantial variations. Accordingly, it is submitted that that the invention should not be limited to the described embodiments but rather should be limited only by the spirit and scope of the appended claims.

Thus, although the invention has been described and illustrated with a certain degree of particularity, it is understood that the present disclosure has been made only by way of example, and that numerous changes in the combination and arrangement of steps or orientation of parts can be resorted to by those skilled in the art without departing from the spirit and scope of the invention, as will be claimed.

The invention claimed is:

1. An electronic system for providing an interface with a remotely located smart voicemail network, said electronic system comprising:
    computing means for obtaining voicemail messages from said voicemail network, said computing means operating a file storing applet adapted to electronically collect voicemail messages from said voicemail network and store said voicemail messages in a voicemail storage database;
    network connection means for providing electronic communication between said computing means and said voicemail network;
    a computing applet operable to interface with said file storing applet and create mechanisms for users to be notified of said voicemail messages and to interact with said voicemail messages;
    an output device for visually displaying notification indicia and audibly playing said voicemail messages; and
    means for delivering selected voicemail messages from said voicemail storage database to said output device;
    wherein said computing means causes said output device to visually display a notification indicia upon receiving an operating command for said output device,
    wherein said computing applet and said file storing applet operate collectively to handle notification of, playing of, and management of said voicemail messages so as to provide a unified interface for entertainment and voicemail management, and
    wherein said voicemail network is configured to send voicemail notification emails containing said voicemail messages and identification information concerning said voicemail messages, and said file storing applet detaches said voicemail messages from said voicemail notification emails and stores said voicemail messages in a predetermined file folder.

2. The system according to claim 1, wherein said voicemail network is configured to send voicemail notification emails to a designated email address for a subscriber user associated with said electronic system when voicemail messages are received, said computing means is adapted to receive voicemail notification emails sent to said designated email address, and said file storing applet is adapted to identify a voicemail notification email that was sent from said voicemail network and associate a voicemail message therewith.

3. The system according to claim 2, wherein said voicemail notification emails cause said file storing applet to connect to said voicemail network and download said voicemail messages associated with said voicemail notification emails.

4. The system according to claim 2, wherein said voicemail notification emails further contain metadata concerning said voicemail messages, and wherein said metadata is displayed with said notification indicia.

5. The system according to claim 1, wherein said voicemail network provides a web interface for subscribers to access voicemail messages over Internet, and wherein said file storing applet is adapted to collect new voicemail messages from said voicemail network automatically via Internet.

6. The system according to claim 1, wherein said file storing applet is adapted to interface with both a web interface of said voicemail network and to monitor said voicemail notification emails received from said voicemail network.

7. The system according to claim 1, wherein said output device comprises a television, said means for delivering comprises a television set top box adapted to deliver television signals to said television and networked to said computing means, and said computing applet is a user interface applet resident on said set top box.

8. The system according to claim 7, wherein said set top box is a digital video recorder, and said computing means is a personal computer operable to serve a multimedia files to said digital video recorder.

9. The system according to claim 1, wherein said output device comprises an electronic display, said computing means comprises a media center computer connected to said electronic display, and said means for delivering comprises a media player application resident in said media center computer and adapted to deliver multimedia output signals to said electronic display, and said computing applet is a voicemail notification applet resident on said media center computer.

10. The system according to claim 9, wherein said media player application comprises a television tuning application.

11. The system according to claim 9, wherein said predetermined file folder is resident in said media center computer, and wherein said means for delivering further comprises means for delivering selected voicemail messages from said predetermined file folder.

12. The system according to claim 1, wherein said file storing applet is adapted to collect and manage voicemail messages from multiple voicemail boxes such that they may be managed through said unified interface.

13. The system according to claim 12, wherein said network connection means comprises a voice over internet protocol router.

14. The system according to claim 1, wherein said operating command for said output device is selected from the group consisting of a command to change the displayed channel, a command to display program guides, a command to display recorded programming, and a command to display an operating menu.

15. A method for providing an interface with a remotely located smart voicemail network via a home entertainment system, said method comprising:
    establishing a voicemail box with said smart voicemail network;
    identifying when one or more voicemail messages are received in said voicemail box;
    collecting said one or more voicemail messages from said voicemail network;
    storing said one or more voicemail messages in a voicemail storage database;
    monitoring said voicemail storage database to identify when said storing occurs;
    generating a visually detectable notification indicia upon identifying one or more stored voicemail messages;
    displaying said visually detectable notification indicia on an electronic display upon receiving an operating command for said home entertainment system;
    audibly playing said stored voicemail messages via said home entertainment system upon a user command prompted by said visually detectable notification indicia; and
    configuring said voicemail network to send voicemail notification emails containing said one or more voicemail messages,
    wherein said storing includes:
        detaching said one or more voicemail messages from said voicemail notification emails, and
        storing said one or more voicemail messages in a predetermined file folder.

16. The method according to claim 15, further comprising configuring said voicemail network to send voicemail notification emails to a designated email address for a subscriber user associated with said voicemail box when said one or more voicemail messages are received, and wherein said identifying comprises:
    receiving voicemail notification emails sent to said designated email address,
    identifying a voicemail notification email that was sent from said voicemail network, and
    associating a new voicemail message event therewith.

17. The method according to claim 16, wherein said voicemail notification emails cause an automated process to connect to said voicemail network and download said one or more voicemail messages associated with said voicemail notification emails during said collecting.

18. The method according to claim 16, wherein said voicemail notification emails further contain metadata concerning said one or more voicemail messages, and wherein said metadata is displayed with said notification indicia.

19. The method according to claim 15, wherein said voicemail network is configured to provide a web interface for accessing voicemail messages in said voicemail box over Internet, and collecting comprises an automated process that obtains new voicemail messages over Internet via said web interface.

20. The method according to claim 15, wherein said home entertainment system comprises a television and a set top box adapted to deliver television signals to said television, and said set top box is networked to said personal computer storing said voicemail messages, and wherein said method is automated by one or more processes running on said set top box and said personal computer.

21. The method according to claim 20, wherein said set top box is a digital video recorder, and personal computer is configured to serve a multimedia files to said digital video recorder.

22. The method according to claim 15, wherein said home entertainment system comprises a media center computer operable to deliver multimedia content to a display, and wherein said method is automated by one or more processes running on said media center computer.

23. The method according to claim 22, wherein said media center computer has resident thereon a media player application that is capable of performing television signal tuning.

24. The method according to claim 15, wherein said establishing, identifying, collecting, and storing are repeated for multiple voicemail boxes such that said method enables a user to collect and manage voicemail messages from multiple voicemail boxes through a unified interface.

25. The method according to claim 15, wherein said network connection means comprises a voice over internet protocol router.

26. The method according to claim 15, wherein said operating command for said home entertainment system is selected from the group consisting of a command to change the displayed channel, a command to display program guides, a command to display recorded programming, and a command to display an operating menu.

27. An electronic system for providing a television interface with a remotely located smart voicemail network adapted to send new voicemail messages as attachments in email notification messages, said electronic system comprising:

a television;

a computer connected to Internet and configured to receive email messages from said voicemail network, said computer having a file storing applet running thereon that is adapted to identify email messages received from said voicemail network; and a set top box operable to control the operation of said television and networked with said computer;

wherein said voicemail network is configured to send voicemail notification messages when said new voicemail messages are received, and wherein said file storing applet detaches said new voicemail messages from said voicemail notification messages and stores each said new voicemail message from each said voicemail notification message into a designated file folder, and said set top box has a user interface applet running thereon that:

monitors said file folder to identify presence of said new voicemail messages in said file folder, and causes notification indicia to be displayed by said set top box on said television upon identifying presence of said new voicemail messages upon receiving an operating command for said television, so as to provide a unified interface for entertainment and voicemail management.

28. The system of claim 27, wherein said operating command for said television is selected from the group consisting of a command to change the displayed channel, a command to display program guides, a command to display recorded programming, and a command to display an operating menu.

* * * * *